Patented May 30, 1950

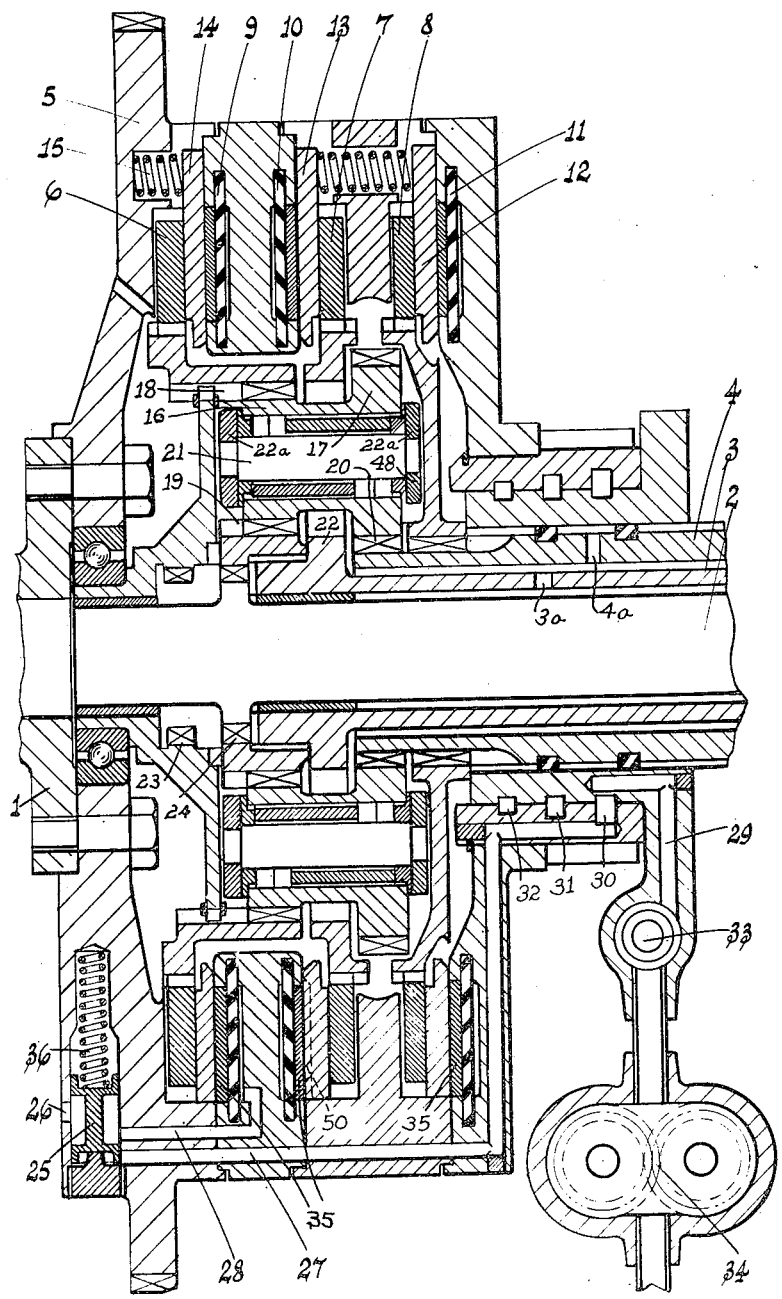

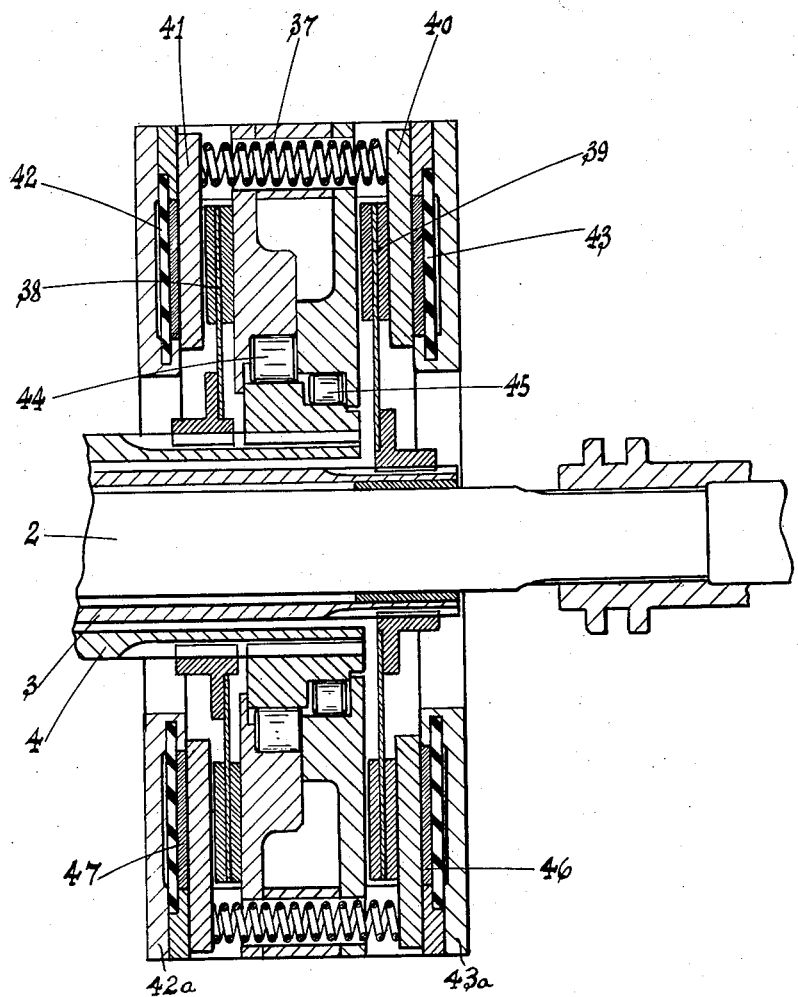

2,509,820

UNITED STATES PATENT OFFICE 2,509,820

POWER TRANSMISSION APPARATUS

Howard Frederick Hobbs, Leamington Spa, England, assignor to Hobbs Transmission Limited, London, England, a British company Application December 10, 1946, Serial No. 715,205
In Great Britain December 13, 1945

6 Claims. (Cl. 74—763)

This invention relates to power transmission apparatus and its main object is to provide an improved form of epicyclic gearing, i. e. gearing of the type comprising a toothed sun-wheel, a second toothed element, pinions in gear with the sun-wheel and operatively connected with the second toothed element, a cage carrying the pinions, and means for holding, freeing, and driving the various parts to obtain required transmission ratios. The gearing may be planetary and/or differential.

According to the invention an apparatus which provides different ratios by holding, freeing, and driving various parts includes an epicyclic gear train comprising a sun-wheel, a number of planet pinions in gear with the sun-wheel, a cage carrying the spindles of said pinions, a toothed gear operatively connected with said pinions, and output shaft, means which operatively connect the output shaft to one of the elements of the gear train during operation in one transmission ratio and which operatively connect the output shaft to another of said elements during operation in another ratio, and means for holding the two elements of the gear train thus engageable relatively stationary whilst the gear train is still transmitting power when it is required to disengage the one element and engage the other.

One form of the invention will now be described by way of example with reference to the accompanying drawings wherein:

Figure 1 is a vertical sectional view of the front part of an apparatus made in accordance with the invention; and Figure 2 is a vertical sectional view of the rear part of the same apparatus.

The apparatus has an input shaft or engine crankshaft 1, and an output shaft 2. Surrounding the output shaft 2 are two concentric sleeves 3, 4 which serve as reaction shafts.

The input shaft 1 carried a housing 5 in which three clutch presser rings 14, 13, 12 are mounted. Pressure applied to these rings engages friction clutch plates 6, 7, 8 respectively. The housing 5 contains three flexible diaphragms 9, 10, 11, to one side of each of which fluid under pressure can be admitted from a pump 34 and a control valve 33 and suitable ducts such as 29, 30, 27, 31, 32.

A centrifugally balanced pressure operated spring pressed valve 25, is associated with each diaphragm and these serve to either open a duct such as 27 to the diaphragm through ducts such as 28, or to open the diaphragm to exhaust through the ducts 28 and exhaust holes 26. A spring 36 urges the valve outwards and should pressure be removed from the duct 27 by operation of the valve 33, the valve 25 will move outwards and exhaust the oil from behind the diaphragm. If pressure is directed from the valve 33 to the duct 27 it will act upon the outer end of the valve 25 causing it to move inwards. Springs 15 serve to press the presser rings towards the designed position. The parts of the gear are arranged so that oil for lubrication fed to the epicyclic gear train hereinafter to be described, reaches the inside diameters of the presser plates. When the clutches are disengaged the oil passes outwards through grooves in the presser plates, one such groove 50 being shown. Insulator plates 35 separate the presser plates from the diaphragms. When the clutches are disengaged the presser plate abuts against the part of the housing in which the diaphragms are located, and the oil cannot then easily reach the grooves and some of it passes over the presser plates and reaches the clutch facings. The lubricating oil is supplied from the pump by means of drillings to the spaces between the shafts 2, 3 and 4, from whence it passes to lubricate the gearing and the clutches. The purpose of lubricating the clutches is to provide smoothness in take up and to prevent wear on the facings. Suitable drillings are shown on the drawings at 3a and 4a.

A planetary differential epicyclic gear is provided which includes a cage 22 which is mounted on the reaction shaft 3 and carries the clutch plate 7. The cage includes bearings 22a which carry the spindles 21 of a set of double pinions 16, 17, of different size. The pinions 16, 17, of each pair are integrally connected and the smaller pinions 16 gear with a sun-wheel 19 and the larger pinions 17 are in gear with teeth 20 constituting a second sun-wheel formed on the reaction shaft 4. The epicyclic gear also includes an internally toothed ring gear 18 that also meshes with the smaller pinions 16 and carries the clutch plate 6. The clutch plate 8 is mounted on the reaction shaft 4.

Supporting the ring gear is a disc which carries a set of internal teeth 23. The sun-wheel 19 carries a similar set of teeth 24 and the output shaft 2 has a set of teeth engageable with one or the other of the sets of teeth 23, 24. By moving the output shaft axially it can, therefore, be engaged with either the sun-wheel or the ring gear. The sleeves 3, 4, carry reaction brake plates 38, 39, respectively. The sleeve 4 also carries the inner member of a roller freewheel or unidirectional brake 44 and of a bearing 45. The reaction brakes are of similar construction to the clutches and comprise the presser plates 40, 41, the insulator plates 46, 47 and the diaphragms 43, 42 carried by the stationary side plates 42a and 43a. A common spring 37 serves to disengage the presser plates and to hold them against an abutment so that lubricating oil fed from holes in the sleeve 3, 4 will be diverted to the friction surfaces. When the brakes are in the engaged condition the oil will pass between the presser plates and the insulator plates as previously described in connection with the clutches. Air will also be drawn either on the one side or the other of the presser plate according to whether the brake is engaged or disengaged. This tends to cool the parts and also to carry the oil in the desired directions.

The apparatus described provides a reverse ratio, three forward indirect ratios, a direct ratio and an overdrive. The various ratios are obtained as follows:

First ratio is obtained with the output shaft moved to its rearward position so as to engage the sun-wheel 19, by engaging the clutch 6 and brake 38. Reaction torque is imparted through the sleeve 4 and this is largely carried by the brake 44. The brake 38 will be insufficiently large to carry the full over-run reaction torque, so that should the brake be engaged with the gear running at high speed no damage or shock will result.

Second speed is obtained by disengaging clutch 6 and engaging clutch 7. Brake 38 will remain engaged.

Third speed will be obtained by disengaging clutch 7 and brake 38 and engaging clutch 8 and brake 39.

Fourth speed, direct, is obtained by disengaging the brake 39 and engaging the clutches 8, 7, together, or if desired, 8, 7, 6 together. Whilst operating in this condition the output shaft can be moved forward so as to disengage the sun-wheel 19 and engage the teeth on the disc carrying the ring gear 18, the sun-wheel and the ring gear being relatively stationary. With the ring gear engaging the output shaft 2, the clutch 7 will be left engaged and 8 and 9 disengaged and the reaction brake 38 applied. This gives fifth speed which is an overdrive the output shaft 2 being driven at greater speed than that of the input shaft 1.

Reverse is obtained with the output shaft in the forward position, i. e. in engagement with the ring gear 18 and for reverse the clutch 8 and the brake 39 are engaged.

If only the clutches 7 and 8 are provided four speeds are obtainable; this can be effected merely by removing the clutch plate 6.

The sleeve 3 which carries the brake 39 may also be provided with a dog clutch at its rear end to assist the brake 39 to carry the reaction torque during reverse ratio drive. The shaft 2 may be operated by means of an hydraulic piston working within a cylinder and the oil pressure may be led to one end or the other from the valve 33.

Instead of the output shaft 2 being provided with teeth to engage either the sun-wheel or ring gear, the sun-wheel and ring gear may both be mounted upon the shaft, but spaced sufficiently so that movement of the shaft will engage either the sun-wheel with the pinions or the ring gear with the pinions.

It will be clear that the invention may be applied in various other forms, for example the output shaft 2 may engage either the cage or the ring gear; alternatively the cage of the sun-wheel. There may be but a single set of pinions and a simple epicyclic train may provide a reduced ratio, a direct ratio and an increased ratio by driving or holding one or the other elements and by engagement of the output shaft as already described.

The output shaft could carry two toothed annuli for engaging the teeth 23, 24 respectively.

I claim:

1. A power transmission comprising an input shaft, a housing carried by said input shaft, fluid pressure operated means carried by said housing, an axially movable output shaft, inner and outer reaction shafts concentric with the output shaft, brake means associated with each reaction shaft, a first friction clutch member carried by the outer shaft, an epicyclic gear train having a first sun wheel carried on said outer shaft adjacent said clutch member and a second sun wheel with inner teeth thereon, a cage mounted on the inner reaction shaft and carrying a second friction clutch member, duplex pinions carried by the cage, each of said duplex pinions consisting of a small and a larger pinion fixed together, said larger pinions being engageable with the sun wheel mounted on the outer reaction shaft and said small pinions being engageable with the second sun wheel, a ring gear carrying a third clutch member and engageable with the small pinions, a disc member having inner gear teeth and supporting the ring gear, teeth on the output shaft selectively engageable with the inner teeth of the disc member or the second sun wheel when said output shaft is moved axially, and selective means for said fluid pressure operated means for selectively engaging said clutch members.

2. A power transmission comprising an input shaft, a housing carried by said input shaft, fluid pressure operated means carried by said housing, an output shaft, inner and outer reaction shafts, brake means associated with each reaction shaft, a clutch member carried by the outer reaction shaft, a multiple number of duplex planet pinions, each duplex pinion comprising a large and a small gear, a cage carrying said duplex pinions mounted on the inner reaction shaft, a second clutch member mounted on the cage, gear means on the outer reaction shaft engageable with one of the gears of each of said duplex pinions, a second gear means engageable with the other gears of each of said duplex pinions, a ring gear engageable with the said other gears of each of said duplex pinions, means for selectively clutching the output shaft with either the ring gear or the second gear means and selective means for said fluid pressure operated means for selectively engaging said clutch members.

3. A power transmission comprising an input shaft, a housing carried by said input shaft, fluid pressure operated means carried by said housing, an output shaft, inner and outer reaction shafts, brake means associated with each reaction shaft, a clutch member carried by the outer reaction shaft, a multiple number of duplex planet pinions each pinion, comprising a large and a small gear a cage carrying said duplex pinions mounted on the inner reaction shaft, a second clutch member mounted on the cage, gear means on the outer reaction shaft engageable with one of the gears of each of said duplex pinions, a second gear means engageable with the other gears of each of said duplex pinions, a ring gear engageable with said other gears of each of said duplex pinions, means for selectively clutching the output shaft with either the ring gear or the second gear means, and selective means for said fluid pressure operated means for selectively engaging said clutch members thereby providing a first drive ratio when the second clutch member and the outer reaction shaft brake means are engaged and the output shaft is engaged with the second gear means, a second drive ratio when the first clutch member and the inner reaction shaft brake means are engaged and the output shaft is engaged with the second gear means, a third drive ratio or direct drive when both the clutch members are engaged and the output shaft is engaged with either the ring gear or the second gear means, both the ring gear and the second gear means rotating at the same speed during direct drive, and a fourth drive ratio when the second clutch member outer reaction shaft brake means are engaged and the output shaft is engaged with the ring gear.

4. A power transmission apparatus comprising an input shaft, at least two sets of friction members carried by the input shaft, an epicyclic gear train having sun wheels, a ring gear, a number of double planet pinions in mesh with the sun wheels and the ring gear, spindles carrying the pinions and a cage carrying said spindles, two rotary elements, friction clutch means carried by each of said elements, one of the elements also carrying the cage and the other of the elements in mesh with the pinions, brake means associated with each element, an output shaft, teeth on the output shaft, means for selectively clutching the output shaft with either the ring gear or one of the sun wheels, and selective means for engaging said friction members to said clutch means.

5. A power transmission apparatus comprising an input shaft, at least two sets of friction members carried by the input shaft, an epicyclic gear train having sun wheels, a ring gear, a number of duplex planet pinions in mesh with the sun wheels and the ring gear, spindles carrying the pinions and a cage carrying said spindles, two rotary elements, friction clutch means carried by each of said elements and cooperating with said friction members whereby either one or both of said elements can be driven through the clutches at different stages of operation, one of the elements also carrying the cage and the other of the elements carrying one of said sun wheels in mesh with the pinions, brake means associated with each element, an output shaft, teeth on the output shaft, and means for selectively clutching the output shaft with either the ring gear or one of the sun wheels, thereby providing direct drive ratio when both friction clutches are engaged simultaneously, a drive ratio below direct drive when one of the clutches and one of the brake means are engaged and the teeth on the output shaft are engaged with the sun wheel and a drive ratio above direct drive when the other clutch is engaged and the teeth on the output shaft are engaged with the ring gear.

6. A power transmission apparatus comprising an input shaft, at least two sets of friction members carried by the input shaft, an epicyclic gear train having sun wheels, a ring gear, a number of double planet pinions in mesh with the sun wheels and the ring gear, spindles carrying the pinions and a cage carrying said spindles, two rotary elements, friction clutch means carried by each of said elements and cooperating with the friction members whereby either one or both of said elements can be driven through the clutches at different stages of operation, one of the elements also carrying the cage and the other of the elements carrying one of said sun wheels in mesh with the pinions, brake means associated with each element, an axially movable output shaft, teeth on the output shaft, and means for selectively clutching the output shaft with either the ring gear or one of the sun wheels, thereby providing direct drive ratio when both friction clutches are engaged simultaneously, a drive ratio below direct drive when one of the clutches and one of the brake means are engaged and the teeth on the output shaft are engaged with the sun wheel, and a drive ratio above direct drive when the other clutch is engaged and the teeth on the output shaft are engaged with the ring gear, the teeth on the axially movable output shaft being engageable with either the sun wheel or the ring gear during direct drive ratio whereby the output shaft may be engaged with that element of the epicyclic gear which is to be used in the next selected ratio.

HOWARD FREDERICK HOBBS.

REFERENCES CITED

The following references are of record in the file of this patent:

UNITED STATES PATENTS

| Number | Name | Date |
|---|---|---|
| 1,316,740 | Reeve | Sept. 23, 1919 |
| 2,112,487 | Freeborn | Mar. 29, 1938 |
| 2,351,061 | Meyer et al. | June 13, 1944 |
| 2,395,459 | Carnagua | Feb. 26, 1946 |

FOREIGN PATENTS

| Number | Country | Date |
|---|---|---|
| 146,668 | Great Britain | July 15, 1920 |